(12) United States Patent
Holmquist

(10) Patent No.: US 6,308,118 B1
(45) Date of Patent: Oct. 23, 2001

(54) METHOD FOR DETERMINING THE POSITION OF AN AUTOMATED GUIDED VEHICLE

(75) Inventor: Fredrik Holmquist, Gothenburg (SE)

(73) Assignee: NDC Netzler & Dahlgren Co. AB, Saro (SE)

( * ) Notice: Subject to any disclaimer, the term of this patent is extended or adjusted under 35 U.S.C. 154(b) by 0 days.

(21) Appl. No.: 09/546,807

(22) Filed: Apr. 11, 2000

Related U.S. Application Data

(63) Continuation of application No. PCT/SE98/01840, filed on Oct. 13, 1998.

(30) Foreign Application Priority Data

Oct. 17, 1997 (SE) .................................................. 9703779

(51) Int. Cl.$^7$ .................................................. G01S 5/08
(52) U.S. Cl. .............................. 701/23; 318/587; 180/167
(58) Field of Search ................................. 701/23, 24, 25, 701/26, 207, 300, 301; 318/587; 180/167, 168, 169

(56) References Cited

U.S. PATENT DOCUMENTS

| | | | |
|---|---|---|---|
| 4,069,888 | * 1/1978 | Wolters et al. | 318/587 |
| 4,554,498 | * 11/1985 | Fujiwara et al. | 318/587 |
| 4,786,164 | * 11/1988 | Kawata | 180/169 |
| 4,811,228 | 3/1989 | Hyyppa . | |
| 5,202,742 | * 4/1993 | Frank et al. | 180/167 |
| 5,251,133 | 10/1993 | Kamimura et al. . | |
| 5,367,458 | 11/1994 | Roberts et al. . | |
| 5,426,584 | 6/1995 | Kamimura et al. . | |
| 5,995,884 | * 11/1999 | Allen et al. | 701/24 |

FOREIGN PATENT DOCUMENTS

95/29380   11/1995   (WO) .

* cited by examiner

Primary Examiner—Gary Chin
(74) Attorney, Agent, or Firm—Altera Law Group LLC

(57) ABSTRACT

A method for position finding of an automated guided vehicle using detection of angle positions for anonymous reflectors ($R_1$–$R_{11}$). The anonymous reflectors are arranged in positions in a limited transport area, and the positions are stored. A concentrated beam (B) is emitted from a vehicle (10) and is made to pass over a search sector. The angle position in relation to a reference direction (D) of the vehicle (10) in reflective objects is continually detected during the sweep of the beam over the search sector, and corresponding angle values are determined. Initially the following measures are taken for association of the angle positions to physical reflectors, and for determination of the position of the vehicle (10); i) at least three angle values with a suitable distribution over the search sector is selected, ii) the angle values are associated to reflectors and a position is determined for the vehicle on the basis of the known position of the assumed reflectors, iii) if the vehicle position determined in this way is within a certain part of the transport area the other angle values are associated to reflectors, iv) for each angle value, existing deviation is determined between detected angle values and angle values expected between the vehicle position and known reflectors, v) the measures taken are repeated for each possible combination of selected angle values. A combination of associations with the best possible agreement on the vehicle position is selected, whereby the position and direction of the vehicle is determined.

9 Claims, 4 Drawing Sheets

METHOD FOR DETERMINING THE POSITION OF AN AUTOMATED GUIDED VEHICLE

This application is a continuation of PCT/SE98/01840 filed Oct. 13, 1998.

SCOPE OF THE INVENTION

The invention relates to a method for determining the position of an automated guided vehicle.

STATE OF THE ART

Automated guided vehicles are used in many industrial settings, for example in the form of trucks for transport of goods in factories and warehouses. According to a commonly used system, magnetic loops or similar are laid out along the transport paths of the trucks. As a result of high initial costs and difficulties in later modification of the route followed by the trucks, systems with locational light reflectors have been developed.

According to certain known systems, reflectors are used with identification, i.e., on the basis of the reflected signal instruments on the vehicles can directly determine which unique reflector the signal is coming from. Such systems can be fast and effective, but the unique reflectors are relatively expensive. There are also limitations as regards the distance at which the signal can be registered and similar problems.

A navigation system with completely anonymous reflectors in the form of reflector strips or similar is illustrated and described in U.S. Pat. No. 4,811,228. The reflectors lack identity, but they are exactly calibrated as to their position. The position of each reflector is stored on board the vehicle together with relevant coordinates for the transport area. A light source on board the vehicle sends out a concentrated laser beam that sweeps over the transport area. Reflections from the reflectors and other objects are registered and give bearings to a possible reflector.

The following measures are taken initially with stationary vehicles for association of the bearing or angle positions to physical reflectors when the vehicle is located in a known position. Thus, the prerequisite according to this known system is that information regarding the actual position of the vehicle has been transmitted to the vehicle. Three angle values are chosen with suitable distribution over the area to be searched across. The angle values are associated with reflectors and the position of the vehicle is determined on the basis of the known position of the detected reflectors. If the position of the vehicle determined in this way is in agreement with the known position, the remaining angle values are associated, and the vehicle position can be verified. This initial process can be time consuming when a great number of reflectors are used.

The following measures are continually taken for association of the angle positions to physical reflectors. A detected angle position is compared with possible angle positions of stored positions for reflectors, and this angle position is associated with a physical reflector, which yields good agreement with the stored position of a reflector.

After the angle positions or bearings to the reflectors have been associated to actual reflectors, the determination of position and navigation can occur in various ways. Initially triangulation is used. With certain knowledge of the expected position at a point of measurement other methods are used during further travel. The automated guided vehicle is also provided with equipment for continuous updating of the vehicle's motion, for example, through an odometer. In the first place, it is the route traveled by the vehicle between measurement points that is continuously determined, but also the movement of the vehicle while making turns and its direction of movement is determined. Measurement can occur, for example, with respect to the rotation of the drive wheels or other wheels, such rotation then being converted to distance. Also the angle of turn of the vehicle's steering wheel is preferably determined continuously. Data regarding the distance and direction are used as a basis for determination of position and navigation.

In order for the system described in U.S. Pat. No. 4,811,228 to achieve the best performance, a large number of reflectors is required. Since calculation of many combinations is required before a certain association can be made, the time needed for calculation is long. This disadvantage can be only worse if many detected signals originate from sources other than the anonymous reflectors known by their positions, for example from metal objects or windows.

It would therefore be desirable that improved possibilities to filter out undesirable reflections, to increase effectiveness of association, and to lessen the number of required reflectors be present in a system of the type described in U.S. Pat. No. 4,811,228.

THE INVENTION IN SUMMARY

A purpose of the invention is to produce a method for position finding of automated guided vehicles, whereby the disadvantages cited above are avoided at the same time as the desired improvements are achieved.

The vehicle's starting point is at an unknown position in a transport area with several anonymous reflectors. The vehicle, thus, entirely lacks information concerning its current actual position. Multiple angle values corresponding to angle positions towards reflections from reflective objects are determined and stored. An array of at least three angle values with suitable distribution, preferably in a circumferencial and symmetrical fashion, are selected across the search sector. The selected angle values are associated to an array of reflectors, and an assumed position for the vehicle is determined on the basis of the known position of the assumed reflectors.

If the assumed position of the vehicle is within a certain part of the transport area, the remaining angle values are associated to stored reflector positions. For each array of angle values any existing deviation between detected angle values and angle values expected between the vehicle position and known reflector positions is determined. The measures taken are repeated for each possible combination of three angle values, and there is chosen a combination of associations which provides for a good agreement for an assumed vehicle position. After an association has been made in this way, the current vehicle position is determined to be the assumed position.

According to one embodiment of the invention the current distance to the object from where the signal has been reflected is determined in connection with the receiving of a reflected signal on board the vehicle. The distance is compared with the corresponding distance between a reference point on the vehicle in an assumed position and the stored position of a possible reflector. Information concerning the distance is used to make possible more certain judgment of the identity of the reflector.

Further certainty can be achieved if more complete information about the reflectors is collected ahead of time and is available for judgment of the identity of the reflectors. For example, it can be determined ahead of time how the intensity of a signal reflected from reflectors varies with the angle of incidence and distance to the reference point on the vehicle. The sweep time across the reflector can also be determined. This can be true of different types of reflectors, both with respect to the form of the reflectors and the material from which they are manufactured. Another advantage that can be achieved according to the invention is that the determination of the position can occur faster and with greater certainty, even initially, with no knowledge of the current position.

Further advantages and special features of the invention can be seen from the following description drawings.

BRIEF DESCRIPTION OF THE DRAWINGS

The invention will now be described in more detail with the aid of examples of embodiments with reference to the attached drawings on which.

THE INVENTION

Figure 1:
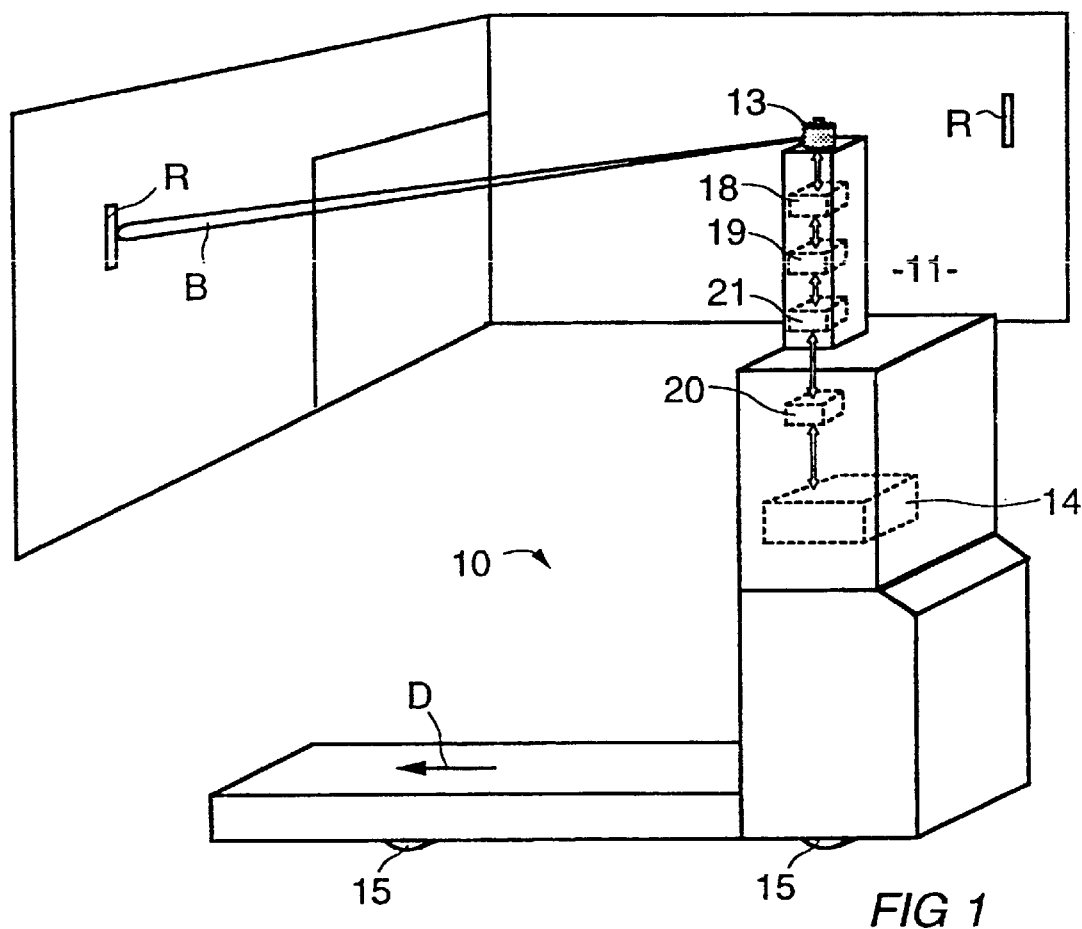
FIG. 1 is a schematic perspective view of an automated guided vehicle exploiting use of the invention.

Vehicle 10 shown in FIG. 1 is embodied as a truck. At the top of a drive and control unit 14 there is provided an emission source 13. The emission source emits a beam B that preferably sweeps around on a plane in the transport area which the vehicle will move about in. The beam can be of various types and, for example, is constituted of light, another electromagnetic beam, or another beam. It is also possible to let the beam illuminate various portions of the transport area discretely point by point or by sectors during various time intervals. In a preferred embodiment the emission source is a light source and the emitted beam is a concentrated laser beam.

In the embodiment shown the vehicle is equipped with means for control with the aid of odometry. Among these means are wheels 15, of which one or more are driving wheels connected with drive unit 14, and one or more are steering wheels with which the vehicle is steered on the desired track. For this purpose one or more of the wheels is provided with means for measurement of the rotation of the wheel by which the distance traveled by the vehicle can continuously be determined. The angle of the steering wheel or of the steering wheels is continuously determined by instruments to measure the angle so that the orientation of the vehicle and its direction of travel can continuously be determined. Drive unit 14 and the wheels can be embodied in another way in the embodiment that lacks control by means of odometry. Corresponding control characteristics can be brought about with, for example, gyroscopes, accelerators, and similar devices.

On board vehicle 10 there is provided an emission source 13 with controller 19. Emission source 13 preferably contains a laser or another device with the ability to emit a concentrated laser beam B. Beam B can be made to rotate around in a search area which can encompass a closed circle. The rotating function can be brought about by letting light beam B be guided through rotating optical instruments such as mirrors and prisms or by letting the light source rotate. On board the vehicle there are also provided receivers that include a detector means 18, which is a light-sensitive and direction-dependent instrument. The position of detector 18 preferably constitutes the vehicle's reference point. An angle sensor continuously emits an angle signal that indicates the direction of light beam B in relation to a reference direction D on the vehicle. There are provided memory means 20 which store data regarding the transport area and reflectors. Detector 18, controller 19, and memory 20 are operatively connected with each other. Preferably, memory 20 is provided together with detector 18 and controller 19 on board vehicle 10.

According to the invention reflectors are placed at well-defined positions in the transport area. In the embodiment according to FIG. 2 a number of reflectors $R_1$–$R_{11}$ are placed in part of the transport area of a warehouse or similar bordered by walls 11. An automated guided vehicle 10 moves through the transport area along a predetermined route 12. Route 12 can easily be altered, for example when remodeling the warehouse, by changing appropriate data in a memory, which is preferably a semiconductor memory or magnetic memory.

Reflectors $R_1$–$R_{11}$ are identical in the embodiment shown. Their position is exactly determined beforehand and stored in a memory together with other relevant information on the transport area and the route vehicle 10 is intended to follow. Some form of CAD system is suitably employed for description and definition of the transport area and position of the reflectors. Also in other embodiments it is possible to embody reflectors $R_1$–$R_{11}$ so that they cannot directly be identified by the signal which is reflected from them or be associated to corresponding reflectors stored in the memory. According to a preferred embodiment the reflectors are comprised of plane disks or bands of retro-reflecting reflective material. The reflectors preferably have less extension horizontally than vertically in order to have sharp lateral limits. For obtaining a secure reflection from a reflector the angle of incidence for beam B should be less than β from the normal direction N.

According to another embodiment cylindrical retro-reflectors are used. This type of reflectors is positioned preferably so that the axis of the cylinder is perpendicular to the plane that the beam moves in. Beam B will thus be given a good reflection around the entire periphery along the horizontal plane.

In other embodiments suitable available objects are used as reflectors. The arrangement of reflectors in such embodiments means that suitable objects must be selected and that the position of the objects must be determined exactly.

Light beam B sweeps around with angular velocity ω and is reflected from reflectors $R_1$–$R_{11}$ and other objects O, for example, tubes, windows 17, or objects on support members 16. A reflected signal is received on board the vehicle by receiver means, which include a light-sensitive detector. The light-sensitive detector also registers the intensity of the received signal in connection with the angle sensor in such a way that the latter registers at which angle a reflecting object is located in relation to reference direction D. In a preferred embodiment the current angle is registered when the reflected signal begins to be received, but other sequencing is possible. Signals corresponding to a value of the current angle and an incoming intensity value for a certain number of reflection signals are stored in memory, for example, on board the vehicle.

Figure 2:
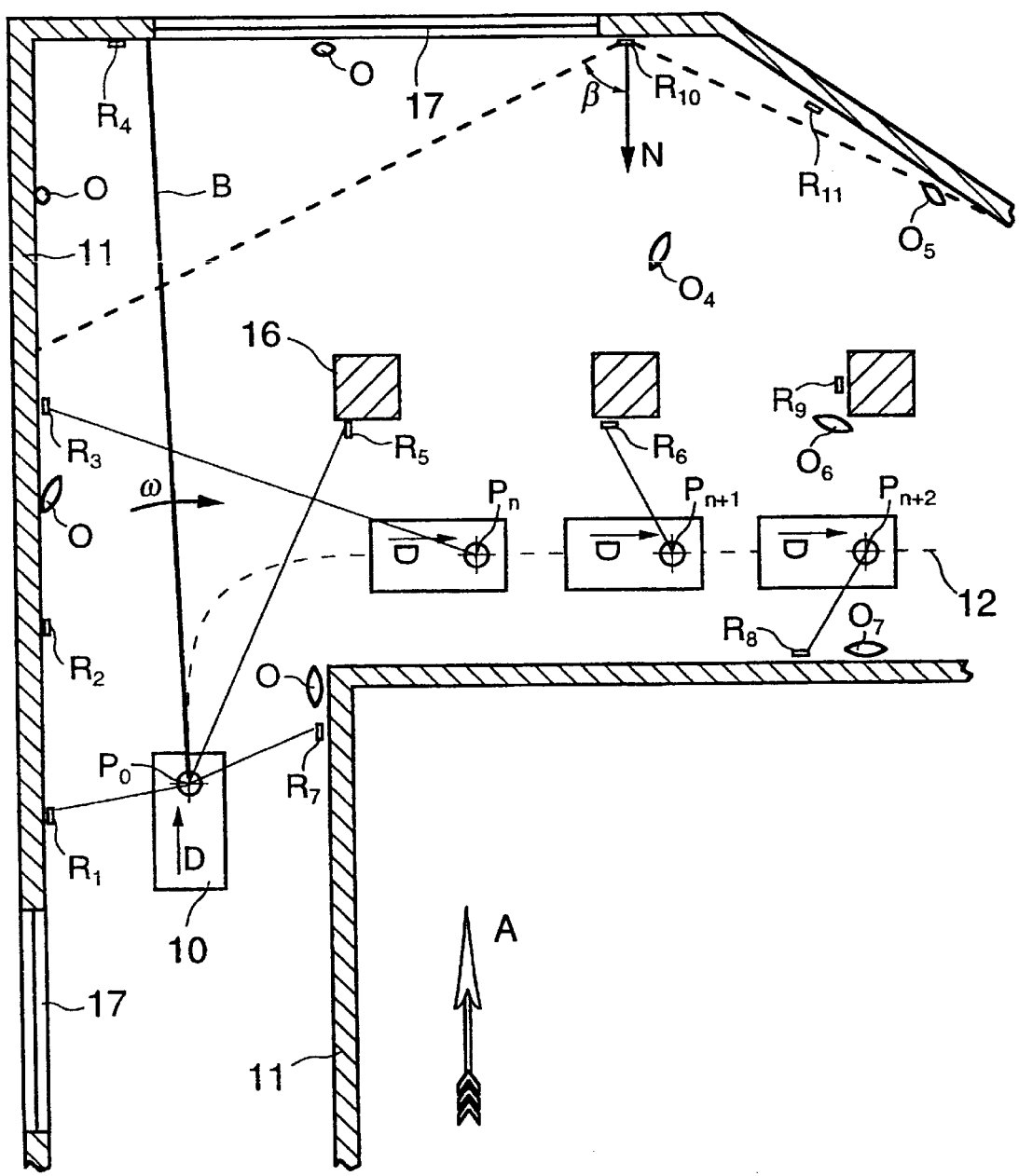
FIG. 2 is a schematic plane view from above of part of the work area of an automated guided vehicle which is provided with an instrument according to an embodiment of the invention.

The principle for navigation of automated guided vehicle 10 in the embodiment according to FIG. 2 is that an initial determination of the position is made with aid of three angle values associated with reflectors. With a stationary vehicle and a bearing to three reflectors the vehicle's position can be determined exactly, for example, by triangulation. The sequence which can be used consists of the following: three angle values with suitable distribution over the sector being swept are selected; the angle values are associated with possible reflectors, and a possible position of the vehicle is determined on the basis of the known position of the assumed reflectors; if the position determined for the vehicle in this way is within some part of the transport area, remaining angle values are associated with stored reflector positions. The number of angle values that cannot be associated, i.e., which deviate too much from expected angle values for stored reflector positions, is determined. If the number of deviating angle values is greater than a certain value, the position determined for the vehicle is rejected. A status value or quality factor is stored in memory for the angle values which lie within a certain angle interval around the expected angle values. This is repeated for every possible combination of three angle values, and a combination of associations with the best agreement on the position of the vehicle is selected. The position that has the lowest mean deviation for the remaining angle values is preferably selected.

When the vehicle is further displaced along track 12, the determination of position and navigation is done in a different way, mainly because the position of the vehicle is essentially known. For every point of position determination the latest recorded angle values that give a bearing towards a reflector are used. In position $P_n$, in FIG. 2, a bearing or angle value to reflector $R_3$ is used. In doing this, information concerning the position is given only with respect to a line. The information is compared with the position determined by dead reckoning and is corrected with respect to the direction exactly determined to reflector $R_3$. In position $P_{n+1}$, reflector $R_6$ is used for determination of the position, and since reflector $R_6$ is displaced in its angle in relation to the earlier indicated reflector $R_3$, the new information concerning the direction will sharply increase the certainty of the determination of position and correction of the position determined by dead reckoning or odometry. A corresponding new determination is made in position $P_{n+2}$ with reflector $R_8$ as the basis. A new reflector is preferably selected for every point of determination, so that the certainty of position determination is as high as possible.

In the current transport area there are also a number of objects O, which reflect light emitted from the vehicle and/or emit light which can be detected as a possible reflector by the receiver on board the vehicle. Information on objects of this kind and elements are stored preferably together with information on the position of the reflectors and can be used for navigation. Information regarding other elements disturbing and hindering navigation in the transport area like walls 11, supports 16, and similar objects that can conceal a reflector can also be stored.

Figure 3:
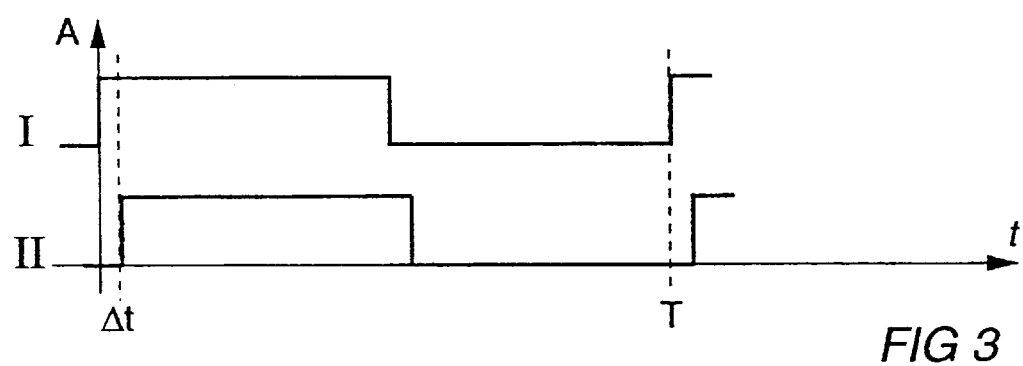
FIG. 3 shows schematically how a signal can be configured to make possible a measurement for distance.

The distance to the reflecting object is also determined in connection with a reflected signal detected by the receiver on board the vehicle. Different procedures can be used. In an embodiment according to the invention the emitted light signal is modulated, for example, in the way indicated in FIG. 3. The time period T is in this case 500 ns (2 MHz). The phase displacement which occurs between the emitted signal I and received signal II corresponds to time $\Delta t$ and can directly be converted as (double the) distance to the reflector. The selected time period T makes possible a measurement of distance up to 75 m. In addition, the duration of time until the reflected signal is detected is determined. The duration is a measure of the size of the reflected object as seen from the vehicle.

The distance can also be measured in other ways and with other instruments than those used with the determination of direction. It is, for example, possible to use another electromagnetic beam or ultrasound for distance measurement.

Information regarding reflective characteristics at different angles and how the intensity of reflected light varies with the distance between the reflector and detector is stored along with information on the position of each reflector.

Figure 4:
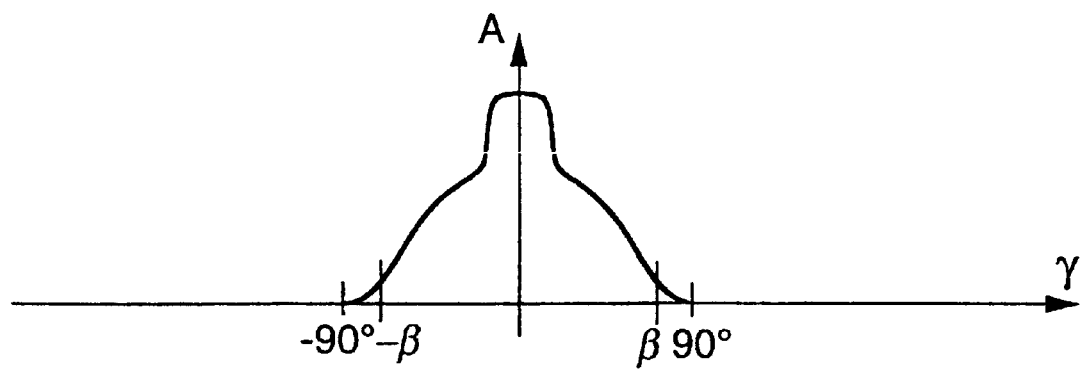
FIG. 4 shows schematically how the amplitude in a reflected signal varies with the angle of incidence of incoming light.
Figure 5:
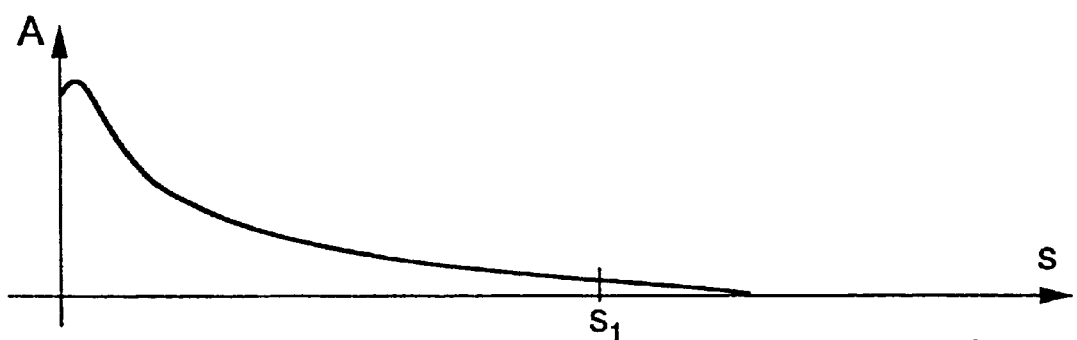
FIG. 5 shows schematically how the amplitude in a reflected signal varies with the distance between the light source/detector and reflecting objects.
Figure 6:
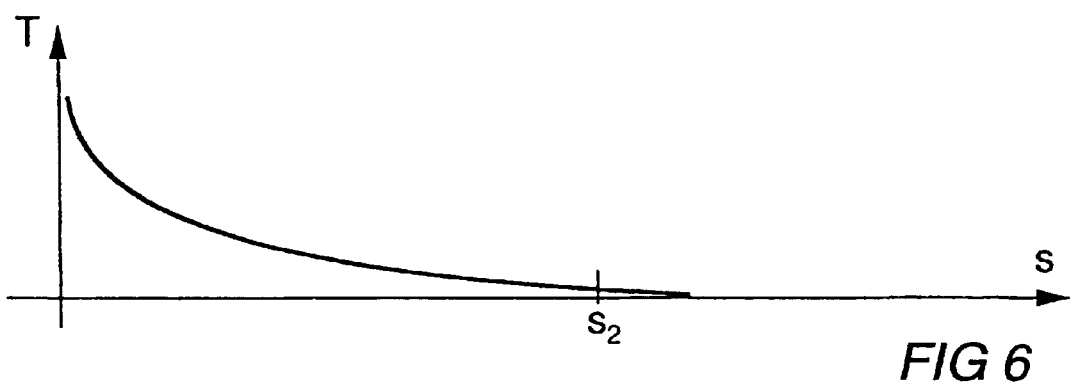
FIG. 6 shows schematically how the duration of a reflected signal varies with the distance between the light source/detector and reflecting objects at perpendicular incidence.

FIG. 4 shows schematically how the reflective characteristics of the reflector can vary with different angles of incidence in relation to the normal direction N of the reflector, when a plane reflection is used. At 0 degrees maximum reflection occurs and at $\pm\beta$ the reflective ability sinks to a lower threshold value. On the X-axis the angle of incidence is shown in degrees, and on the Y-axis the amplitude is shown. FIG. 5 shows schematically how the intensity of the reflected light decreases with the distance between the reflector and detector. On the X-axis the distance is shown, and on the Y-axis the amplitude is shown. FIG. 6 shows schematically how the duration of the reflected light decreases with the distance between the reflector and detector. The relations made clear in FIG. 4, FIG. 5, and FIG. 6 are stored as reference values in memory, for example, in the form of tables or calculation steps, so that the relations can be used in judgment of whether a signal coming to the detector actually originates from a reflector. Information on other reflecting objects like, for example, shiny pipes and windows, can be stored in a similar way. Preferably information on reference values is stored during an initial phase and not in conjunction with association or navigation.

When plane reflectors are used, the time during which a reflected signal returns is compared with corresponding reference values and gives a measure of the reflected object's angle of rotation in relation to the reference point on the vehicle.

The judgment of whether an incoming signal actually originates from a reflector, and in that case from which reflector it can be a question of, occurs in several steps. In a first step, signals are rejected that originate from objects which are located farther away from the vehicle than a predetermined but alterable farthest distance. Similar filtering can occur regarding objects that are located too close to the vehicle.

The duration of the received signal is also determined, whereby the duration beyond a certain interval leads to the signal's not being considered during following steps and will not lead to association with a reflector. The interval has limits that are given initial values but which after that can be adjusted to current conditions. The duration corresponds to the angle that the detector or corresponding optical instrument has time to rotate while the reflected signal is received. This corresponds in turn to the part of the reflecting object in the plane of rotation visible from the detector. An overlong signal can in this respect be the result, for example, of reflection from a wall located nearby with a strongly reflecting outer surface.

In a similar way signals with an intensity value outside of a certain interval are rejected. The interval has limits that are given initial values but which can then be adjusted to current conditions.

A set of reference values for reflectors used with respect to the duration and intensity of the reflected signal, as dependent on different distances between the reflector and the detector, can be stored ahead of time. The reference values are used to compensate for measured duration and intensity values with respect to the distance, so that the selection of reflection signals used is favorable.

The reflections, which fulfill the conditions named above, are considered in the following as possible reflector signals for subsequent navigation that will be associated with the reflectors stored in memory. These reflector signals are preferably given status values, depending on how well they agree with a nominal reflection signal, or signature, from a known reflector.

The position of the known reflectors is found stored in memory as given above. The connection between a reflection and a real reflector is made with an assumed position of the vehicle as the starting point. Normally the assumed or expected position during travel is determined by odometry, but also other methods can be used. Under the assumption that a reflected signal originates from a certain reflector, consideration is given to the following factors:

- if the measured distance lies within a predetermined interval from the distance between the position of the vehicle and the reflector;
- if the amplitude or intensity of the received signal lies within a predetermined second interval from the expected amplitude with respect to the amplitude decreasing with distance, for example, according to the diagram in FIG. 5;
- if the duration of the received signal lies within a third predetermined interval from the expected duration with respect to the distance of the reflector to the vehicle;
- if the measured bearing lies within a predetermined fourth interval from the expected bearing in relation to the reference direction of the vehicle;
- if the intensity of the received signal lies within a predetermined fifth interval from the expected intensity with respect to the angular position of an expected planar reflecting object, whereby the angle position is determined by the relation between a determined duration and a duration expected at the current distance.

The factors are weighed together and result in a value that corresponds to a probability that agreement is obtained. The factors can be judged in a different sequence than that given above. Similarly, different weight can be put on the different factors. The bearing has preferably a great importance with association of a reflected signal with a known reflector. Associations are made continuously during operation, and normally several associations can be made between two determinations of position following each other. A late association, or preferably the association made most recently, is used with approved agreement continuously in the determination of position.

A computer, preferably on board vehicle 10, has access to information that was collected and stored with reference to the special geometry of the vehicle's steering. Based on information on distance, steering angle, and a model of the vehicle's travel, the displacement of the vehicle is calculated at certain time intervals. Updating of the position is accomplished with the aid of a Kalman-filter. The bearing from this calculated position to the reflector selected is compared with the current measured angle value. The difference between the bearing and the angle value is used for correction of the position in the direction that the angle measurement allows.

The determination of position with the aid of angle calculation allows for a greater degree of precision than odometry. Uncertainty of the position can be seen as an ellipse on the x/y plane that grows if only odometry is used and which "flattens out" in the direction transverse to the reflector when determining the position with the aid of the reflector angle. From this it follows that it is suitable to use reflector angles that distribute themselves approximately evenly all around. Monitoring of the uncertainty of the position occurs continuously. If the uncertainty becomes too great, the vehicle is brought to a stop.

Figure 7:
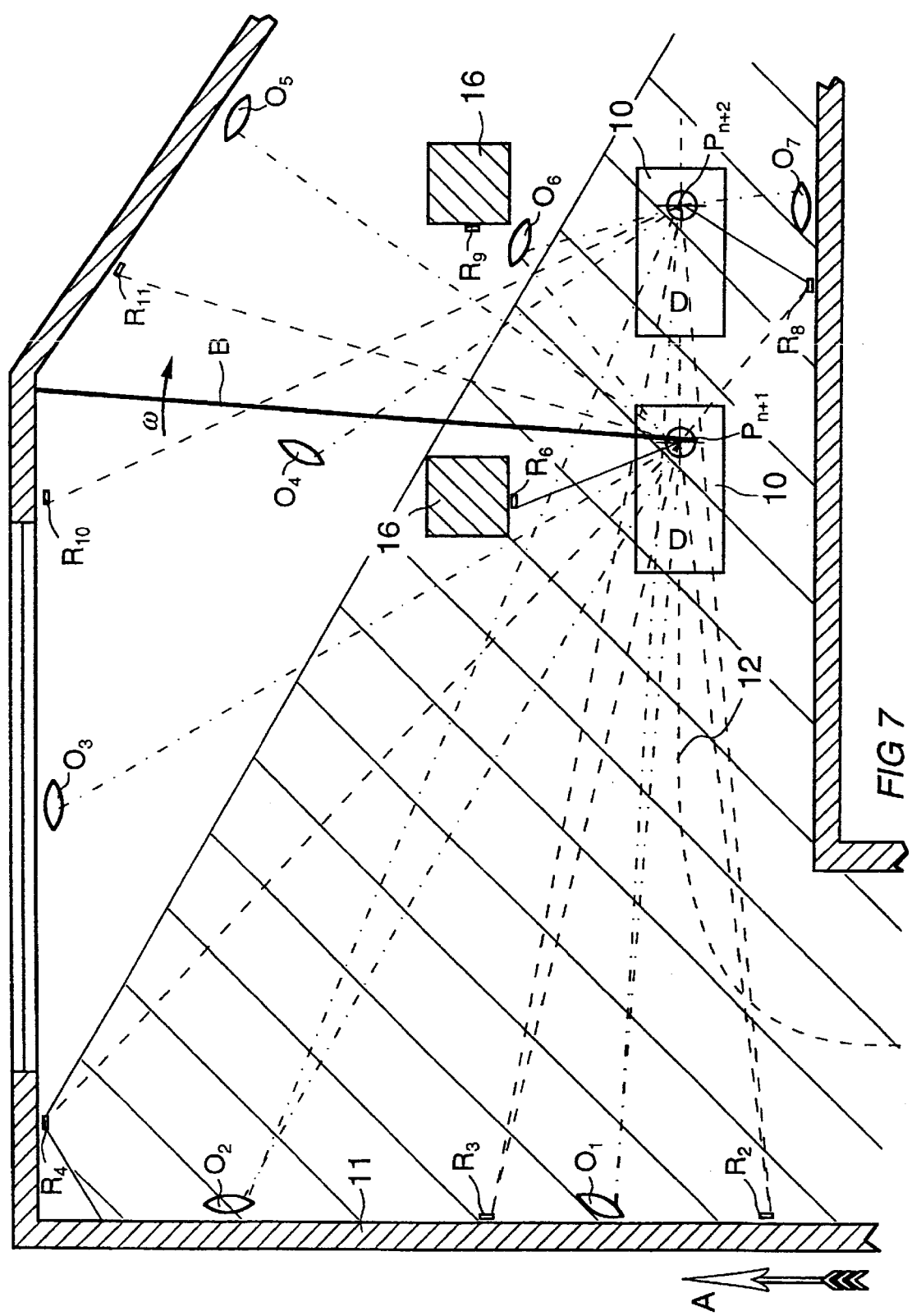
FIG. 7 is an enlargement of the plane view in FIG. 2.

When vehicle 10 is located in position $P_{n+1}$ in FIG. 7 a number of reflections will impinge on the detector during the sweep of beam B during a measurement period. In FIG. 7 the reflections from actual reflectors are marked with dotted lines, while the reflections from other objects are marked with dashed lines. Useful signals come from reflectors $R_2$, $R_3$, $R_4$, $R_6$, and $R_{11}$, and it is the signal from $R_6$ that is used, which is marked with a solid line. During the sweep of beam B, signals from objects $O_1$, $O_2$, $O_3$, $O_5$, and $O_6$ are also detected. The signals from object $O_3$ and the reflector $R_6$ could be confused, at least in some positions along track 12, but because of distance measurement and other processing of signals the risk of confusion is dramatically lessened. In this position support 16 shields reflector $R_{10}$, and it is suitable and advantageous to store information of this type regarding hindrance to line-of-sight in the memory mentioned. Given the problem of associating a reflection with a reflector, such information can be used to exclude certain reflectors already from the beginning.

Signals from reflectors $R_2$, $R_3$, $R_{10}$, and $R_8$ in position $P_{n+2}$ can be used in a similar way. In addition, disruptive signals come from objects $O_1$, $O_2$, $O_4$, $O_6$, and $O_7$. Also in this position the risk of confusion between reflectors and other objects can be sharply reduced if consideration is taken of the measured distances and the signature of the reflected signal.

What is claimed is:

1. A method for determining the position of an automated guided vehicle using detection of angle positions for anonymous reflectors ($R_1$–$R_{11}$), whereby
   a) the anonymous reflectors are arranged in positions in a limited transport area,
   b) the positions of the reflectors (R1–R11) are stored in memory,
   c) a beam (B) is emitted from the vehicle (10) over a search sector,
   d) the angle positions being detected in relation to a reference direction (D) of the vehicle (10) and the reflectors being detected over the search sector and corresponding angle values are determined, characterized by
   e) storing multiple angle values determined over the search sector, and associating angle positions for the reflectors and determining the position of the vehicle (10) by:
      i selecting an array of at least three angle values with a suitable distribution over the search sector,
      ii associating the angle values to the reflectors and determining an assumed position for the vehicle on the basis of known positions of the reflectors, iii associating other angle values to the reflectors if the assumed vehicle position is within a certain part of the transport area, iv determining, for each angle value, a deviation between the detected angle value and an expected angle value, v repeating steps i–iv for a number of combinations of selected reflectors, and f) electing the combination of selected reflectors having the least deviation between the detected and expected angle values.

2. A method according to claim 1, characterized in that distances between the reflectors ($R_1$–$R_{11}$) and a reference point on the vehicle (10) are determined, and that relations between the determined distances and corresponding distances calculated between stored reflector positions and the assumed position for the vehicle are determined, and the elected combination of selected reflectors is allowed if the relations are within expected intervals.

3. A method according to claim 1, characterized in that durations of reflected signals are detected as the beam is swept over the search sector, and values of the durations are determined, that a relation between the values of the durations and expected values of the durations are determined, and that the combination of selected reflectors is allowed, if the relation is within an expected interval.

4. A method according to claim 1, characterized in that intensity of reflected signals are detected and intensity values of reflections from reflective objects is determined, that a relation is established between the determined intensity values and expected intensity values of reflected signals at respective measured distances, and that the combination of selected reflectors is allowed, if the relation is within an expected interval.

5. A method according to claim 2, characterized in that the reflectors ($R_1$–$R_{11}$) are planar reflectors, that an expected intensity of a signal reflected from one of the reflectors ($R_1$–$R_{11}$) at different distances is established as intensity reference values, that an expected duration of a signal reflected from one of the reflectors ($R_1$–$R_{11}$) at different distances is established as duration reference values, that the expected intensity of a signal reflected from one of the reflectors ($R_1$–$R_{11}$) with respect to the angle position of the one of the reflectors ($R_1$–$R_{11}$), relative to a normal direction, is established as an angle factor, that duration of one of the reflected signals is detected as the beam is swept over the search sector, and the value of the duration is determined, that an angle position of one of the reflectors ($R_1$–$R_{11}$) in relation to the normal direction to the vehicle (10) is determined on the basis of a relation between the detected duration and the duration reference values, that intensity of the reflected beam is detected and intensity values of reflections from reflective objects are determined, that the expected intensity value from one of the reflectors ($R_1$–$R_{11}$) at a measured distance measured from the reference point is adjusted with regard to an intensity reference value and the angle factor, and that the combination of selected reflectors is allowed, if the determined intensity value is within an expected interval around the adjusted intensity value.

6. A method according to claim 1, characterized in that the emitted beam (B) is modulated, that the reflections received from objects in the transport area are compared with the emitted beam with regard to time delay, and that the distances between the vehicle (10) and the objects are determined on the basis of respective time delays between a certain phase position of the emitted beam and a corresponding phase position of the received beam.

7. A method according to claim 6, characterized in that the emitted beam is modulated with a square wave with a frequency of approximately 2 MHz.

8. A method according to claim 1, characterized in that the emitted beam (B) is a laser beam.

9. A method according to claim 1, characterized in that the emitted beam (B) is a microwave beam.

* * * * *